United States Patent
Bohme et al.

(10) Patent No.: US 10,436,985 B2
(45) Date of Patent: Oct. 8, 2019

(54) COATING OF OPTICAL WAVEGUIDES

(71) Applicant: Fraunhofer-Gesellschaft zur Forderung der angewandten Forschung e.V., Munich (DE)

(72) Inventors: Steffen Bohme, Jena (DE); Thomas Schreiber, Jena (DE); Gerd Harnisch, Jena (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/369,879

(22) PCT Filed: Dec. 21, 2012

(86) PCT No.: PCT/EP2012/076803
§ 371 (c)(1),
(2) Date: Jun. 30, 2014

(87) PCT Pub. No.: WO2013/098269
PCT Pub. Date: Jul. 4, 2013

(65) Prior Publication Data
US 2014/0369640 A1 Dec. 18, 2014

(30) Foreign Application Priority Data
Dec. 29, 2011 (DE) .................. 10 2011 122 510

(51) Int. Cl.
*G02B 6/00* (2006.01)
*G02B 6/27* (2006.01)
(Continued)

(52) U.S. Cl.
CPC ........ *G02B 6/2726* (2013.01); *B23K 26/0622* (2015.10); *B23K 26/0734* (2013.01);
(Continued)

(58) Field of Classification Search
CPC ............ G02B 6/00; B23K 26/00; C03C 25/00
(Continued)

(56) References Cited

U.S. PATENT DOCUMENTS

| 4,227,907 A | * 10/1980 | Merritt .................... C03C 25/42 427/163.2 |
| 4,575,181 A | 3/1986 | Ishikawa |

(Continued)

OTHER PUBLICATIONS

"Synthesis of SiO thin films by reactive excimer laser ablation", E. Fogarassy, A. Slaoui, C. Fuchs, J.P. Stoquert, Applied Surface Science, vol. 54, Jan. 1, 1992, pp. 180-186.*
(Continued)

*Primary Examiner* — Gordon Baldwin
*Assistant Examiner* — Mohammad Mayy
(74) *Attorney, Agent, or Firm* — Raymond R. Ferrera; Adams and Reese LLP

(57) ABSTRACT

The invention relates to a method for producing an optical waveguide (1), the surface of which is at least partly coated with a coating material. The coating material contained in a target (4) is removed using laser radiation (6) of a processing laser or converted into another aggregate state. The coating material is then deposited on the surface of the waveguide (1) and forms a coating thereon, said coating modifying the light guidance. It is the object of the present invention to provide an improved method for producing optical waveguides, in which guidance of undesired electromagnetic radiation and/or guidance of radiation in undesired areas of the waveguide is avoided. To this effect, the present invention proposes that the laser radiation (7) reflected from the target (4) or transmitted through the target heats-up the waveguide (1), said laser radiation (6) being polarized and impinging the target (4) at a specified angle ($\alpha$) between 10° and 80° relative to the surface normal.

14 Claims, 1 Drawing Sheet

(51) Int. Cl.
*C03C 25/22* (2018.01)
*G02B 6/036* (2006.01)
*G02B 6/02* (2006.01)
*G02B 6/12* (2006.01)
*B23K 26/073* (2006.01)
*B23K 26/12* (2014.01)
*B23K 26/34* (2014.01)
*B23K 26/0622* (2014.01)
*B23K 26/32* (2014.01)
*C03C 25/106* (2018.01)
*B23K 103/00* (2006.01)

(52) U.S. Cl.
CPC ............ *B23K 26/127* (2013.01); *B23K 26/32* (2013.01); *B23K 26/34* (2013.01); *C03C 25/1061* (2018.01); *C03C 25/22* (2013.01); *G02B 6/02395* (2013.01); *G02B 6/03694* (2013.01); *G02B 6/12* (2013.01); *B23K 2103/50* (2018.08); *Y10T 156/10* (2015.01)

(58) Field of Classification Search
USPC .................................................. 427/160–170
See application file for complete search history.

(56) References Cited

U.S. PATENT DOCUMENTS

| | | | | |
|---|---|---|---|---|
| 4,812,150 A * | 3/1989 | Scott | ..................... | C03C 25/106 427/163.2 |
| 5,154,945 A * | 10/1992 | Baldwin | ............... | C23C 16/483 423/446 |
| H1461 H | 7/1995 | DiVita et al. | | |
| 5,760,366 A * | 6/1998 | Haruta | .................. | C23C 14/022 219/121.68 |
| 6,240,224 B1 * | 5/2001 | Reekie | .................. | C03C 25/106 359/337.21 |
| 7,022,382 B1 * | 4/2006 | Khudyakov | ........ | C03C 25/6233 118/620 |
| 7,247,347 B2 * | 7/2007 | Andrieu | ................ | C03C 25/106 427/162 |
| 2003/0161601 A1 * | 8/2003 | Ouyang | .................. | C03C 25/12 385/128 |
| 2004/0120643 A1 * | 6/2004 | Viswanathan | ...... | C03C 25/6233 385/37 |
| 2009/0169871 A1 * | 7/2009 | Lappalainen | ....... | C23C 14/0611 428/332 |

OTHER PUBLICATIONS

"Optical constants of SiO2", Radhakrishnan, two pages, 1951.*
Schriftlicher Bescheid der Internationalen Recherchenbehorde (Form PCT/ISA/220) daed Apr. 26, 2013 in International Application No. PCT/EP2012/076803 (8 pages).
International Search Report with English Translation (Form PCT/ISA/210) dated Apr. 19, 2013 in International Application No. PCT/EP2012/076803 (7 pages).
International Preliminary Report on Patentability Chapter I with English Translation (Form PCT/IB/373) dated Jul. 1, 2014 in International Application No. PCT/EP2012/076803 (12 pages).
Written Opinion of the International Search Authority with English Translation (Form PCT/ISA/237) in International Application No. PCT/EP2012/076803 (10 pages).
Search Report dated Aug. 22, 2012 (10 pages).

* cited by examiner

COATING OF OPTICAL WAVEGUIDES

The invention relates to a method for producing an optical waveguide, the surface of which is at least partly coated with a coating material. The coating material contained in a target is removed using laser radiation of a processing laser or converted into another aggregate state. The coating material is then deposited on the surface of the waveguide and forms a coating thereon, said coating modifying the light guidance.

Optical waveguides, e.g. optical fibers, are utilized for generating and/or transporting high-performance electromagnetic radiation. Part of the radiation is consistently guided in undesired areas (e.g. in the fiber cladding of an optical fiber) or part of the electromagnetic radiation guided at a certain angle into the optical waveguide is undesired for subsequent optical components. The relevant portion of electromagnetic radiation, even though its power only accounts for a little percentage of the power guided in total in the optical waveguide may lead to a destruction of the waveguide or adjacent components (e.g. fiber-optic connectors) with a correspondingly high total performance.

Known from prior art in technology are various approaches to solve the problem described hereinabove.

With comparably low optical performance rates, it is possible to embed the waveguide into a highly-transparent medium (e.g. an adhesive) which is adapted in terms of its refractive index. Accordingly, the refractive index must be greater than or equal to the refractive index of the waveguide so that light emits from the waveguide. Light transported through the adhesive can then be absorbed in a suitable medium and converted into heat. The resultant heat is discharged in an appropriate way. A problem lies in the residual absorption occurring in the medium which in case of high performance rates may lead to strong heating and even to destruction.

Another possibility for discharging undesired electromagnetic radiation lies in slightly roughening or chemically etching the surface of the waveguide, i.e. for example the outer surface of the fiber cladding of an optical fiber. A roughened or etched surface takes the effect that a total reflection at the boundary area towards the medium surrounding the optical waveguide due to local scattering is avoided. Diluted hydrofluoric acid is usually utilized for chemical etching of the surface of a glass fiber. A disadvantage in this approach lies in that the mechanical strength of the optical waveguide is weakened. The resultant fragility complicates a further use of the optical waveguide, for example for installation into a fiber-optical connector. The manufacture of appropriate optical assemblies becomes complex and thus costly. Another problem lies in that a handling of diluted hydrofluoric acid is extremely hazardous and harmful to the environment.

Other methods known from prior art in technology in which directly (partly) absorbing materials are applied on the surface of an optical waveguide are not suitable due to the high heat input for high powers of the electromagnetic radiation to be generated or to be guided.

Therefore, it is the object of the present invention to provide a method for producing optical waveguides that is improved compared to prior art and in which the guidance of undesired electromagnetic radiation and/or the guidance of radiation in undesired areas of the waveguide is avoided. Hence, in other words, it is the object to provide optical waveguides which are high-duty stable and which provide improved radiation quality.

The present invention solves this task based upon a method of the kind described hereinabove in that laser radiation reflected from the target or transmitted through the target heats the waveguide, said laser radiation being polarized and impinging the target at a specified angle between 10° and 80° relative to the surface normal.

In accordance with the present invention, the surface of the optical waveguide is modified in terms of light guidance to the adjacent medium by means of laser-based deposition of the coating material on the optical waveguide in such a manner that undesired electromagnetic radiation is prevented from propagating in the optical waveguide. The coating deposited by laser deposition sticks solidly to the surface of the optical waveguide. The mechanical strength of the waveguide is not diminished worth mentioning by the light-scattering coating. The optical waveguide modified in accordance with the present invention can be utilized without incurring those disadvantages outlined hereinabove, for example for installation into a fiber-optical connector or for setting-up fiber lasers.

Another advantage lies in that the inventive production method is compatible to splicing, cleave and taper processes which can also be performed laser-based on the same production facility. This ensures continuous and efficient confectioning of optical waveguides.

Finally, by way of the inventively induced removal of undesired electromagnetic radiation, an improvement in the radiation quality of the radiation emitted from the optical waveguide is achieved. This opens up further fields of application.

Even for electromagnetic radiation possibly returning into the optical waveguide, an efficient protection is provided by the inventively applied light-scattering coating. This is advantageous for applications in which electromagnetic radiation guided through the optical waveguide is utilized for machining of reflecting materials (e.g. steel), for example for cutting or welding. In such applications, reflected electromagnetic radiation is frequently coupled into the cladding of the optical waveguide and leads to a destruction of the optical waveguide itself and/or of adjacent components. These problems can be avoided by the inventively produced optical waveguide.

Another advantage of the inventive method lies in that the handling with hazardous hydrofluoric acid for etching of the cladding surface of the optical waveguide can be dispensed with.

In accordance with the invention, the target is arranged in such a manner (e.g. in the vicinity, i.e. at an adequately small distance to the waveguide) that laser radiation reflected from the target or transmitted through the target heats the waveguide. It becomes evident that for producing a qualitatively good and well adhering light-scattering coating it is advantageous to warm-up the waveguide before depositing the coating material on it. For removal of the coating material, polarized laser radiation is utilized which impinges the target at a specified angle between 10 degrees and 80 degrees relative to the surface normal. By way of the angle of impact of the polarized radiation, it is possible to control the portion of radiation reflected onto the optical waveguide and thus to control the heating-up of the optical waveguide.

In a preferred embodiment of the inventive method, the coating material is largely transparent for a light propagating in the optical waveguide at an application wavelength. The transparency of the coating applied in accordance with the present invention provides excellent high-duty stability. The undesired electromagnetic radiation discharged by scattering from the optical waveguide is not absorbed in the coating and thus it cannot lead to damage to the optical waveguide and coating. Electromagnetic radiation scattered through the coating can be converted elsewhere by suitable absorbers into heat and thus be destroyed.

On the other hand, the coating material should at least partly absorb the radiation from the process laser utilized for producing the coating. In this manner, the process laser heats the coating material contained in the target, thereby transforms it into the vapor phase so that the coating material then deposits from the vapor phase on the cladding surface of the optical waveguide.

Suitable for use as process lasers for the inventive method, for example, is a $CO_2$ laser. Powerful $CO_2$ lasers are commercially obtainable as extremely reliable standard components.

Suitable as coating material in a preferred embodiment of the inventive method are doped or undoped silica glass or a different material that is chemically equivalent to the material of the waveguide. Silica glass is particularly thermally stable. In result, even in case of a warming-up due to low residual absorption of radiation, there is no need to fear any damage. For wavelengths relevant for numerous applications, silica glass is highly transparent. On the other hand, silica glass absorbs the infrared radiation from a $CO_2$ laser so that silica glass as coating material can be evaporated by means of a $CO_2$ laser for the purpose of producing the light-scattering coating.

With the inventive method, the process laser expediently emits initially continuously at lower performance rate in order to warm-up the waveguide, whereupon the process laser is then operated in pulsed mode at a higher performance rate in order to remove the coating material from the target which then deposits on the heated-up surface of the waveguide cladding.

With the inventive method, the waveguide can be rotated about its longitudinal axis when forming the coating so that the coating is separated evenly from all sides on the surface of the waveguide.

Particularly preferred is one embodiment of the inventive method in which the target circularly encloses the waveguide (partly or wholly). Accordingly, the target is radiated by the process laser, if possible, in an annular zone partly or wholly enclosing the waveguide. In this approach, the light-scattering coating is evenly deposited from all sides onto the surface of the waveguide.

During the inventive deposition of the coating material on the surface of the waveguide, the waveguide can be moved in the direction of its longitudinal axis continuously or intermittently relative to the target. In this manner, the coating can be formed on a surface section with a definable longitudinal extension (e.g. over several centimeters).

With the inventive method, a glass capillary can be collapsed on the optical waveguide after forming the coating in order to thus generate a protective sheathing.

An essential advantage of the present invention furthermore lies in that the formation of the coating can be executed at normal atmosphere (e.g. at air). For example, a chamber that can be evacuated or charged with process gas is then not required for implementing the inventive method. Thus, the coating can inventively be produced at particularly low costs.

The outer diameter of the inventively produced optical waveguide including coating may account for 100 µm up to 10 mm.

In a preferred embodiment, the inventive method can be applied repeatedly so that the coating material is deposited in several layers on the surface of the waveguide. For example, the waveguide can be guided several times past the target for this purpose.

On account of the high-duty suitability of the inventively produced optical waveguide, it is particularly suitable for a build-up of powerful fiber lasers.

Since with the inventively produced optical waveguide, undesired radiation portions are effectively suppressed, the waveguide is ideally suited for confectioning for a fiber-optical connector.

Practical examples of the present invention are elucidated in the following based on drawings, wherein.

Figure 1:
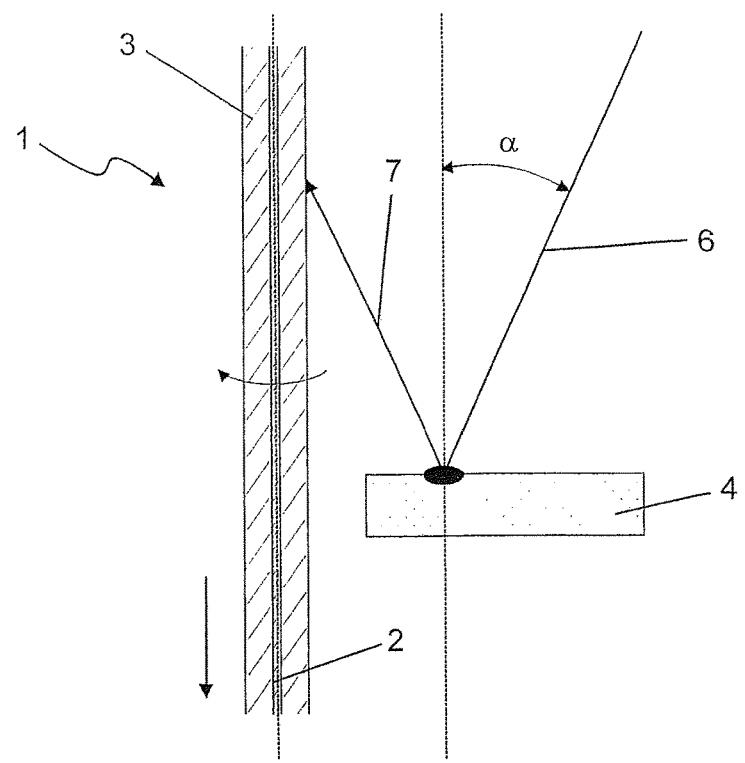
FIG. 1 shows a schematic representation of the inventive method with a coating material target arranged next to an optical fiber.

As outlined hereinabove, the inventive method serves for producing an optical waveguide, for example an optical fiber 1, which is comprised of a fiber core 2 and a fiber cladding 3. By way of implementing the inventive method, the outer surface of the fiber cladding 3 is partly coated with a coating material. The coating material is contained in a target 4 which in the practical example illustrated in FIG. 1 is arranged laterally at a small distance next to fiber 1. With the practical example according to FIG. 2, the target 4 circularly encloses the optical fiber 1. According to FIG. 2, the circular target 4 comprises a central opening 5 which the fiber 1 is guided through. A laser beam 6, for example from a $CO_2$ laser, impinges the target 4.

The laser radiation 6 is polarized and impinges the target 4 at a specified angle α. By means of the angle α, one can adjust the magnitude of the portion of the reflected laser radiation 7 which impinges the fiber cladding 3.

Initially, the laser beam 6 is continuously irradiated (cw-mode), whereby a certain temperature of the fiber cladding 3 is adjusted and set. Immediately after this heat-up process, the laser beam 6 is irradiated in pulsed mode, for example with a pulse duration in a range from approx. 100 µs to 100 ms in order to remove the coating material from the target 4 (for example by evaporation). The coating material then precipitates on the heated-up fiber 1 and adheres there in stable manner.

The coating material deposited from the target 4 on the fiber 1 may be pure or doped silica glass or even a different transparent material that offers adequately good absorption in the range of the wavelength of the laser radiation 6.

To ensure uniform deposition of the coating material on the surface of the fiber cladding 3 over the entire fiber circumference and over a certain longitudinal extension of the fiber, the fiber 1 in the practical example according to FIG. 1 is rotated about its longitudinal axis. At the same time, the fiber 1 is pushed forward continuously or intermittently along its longitudinal axis in the direction of the arrow.

Figure 2:
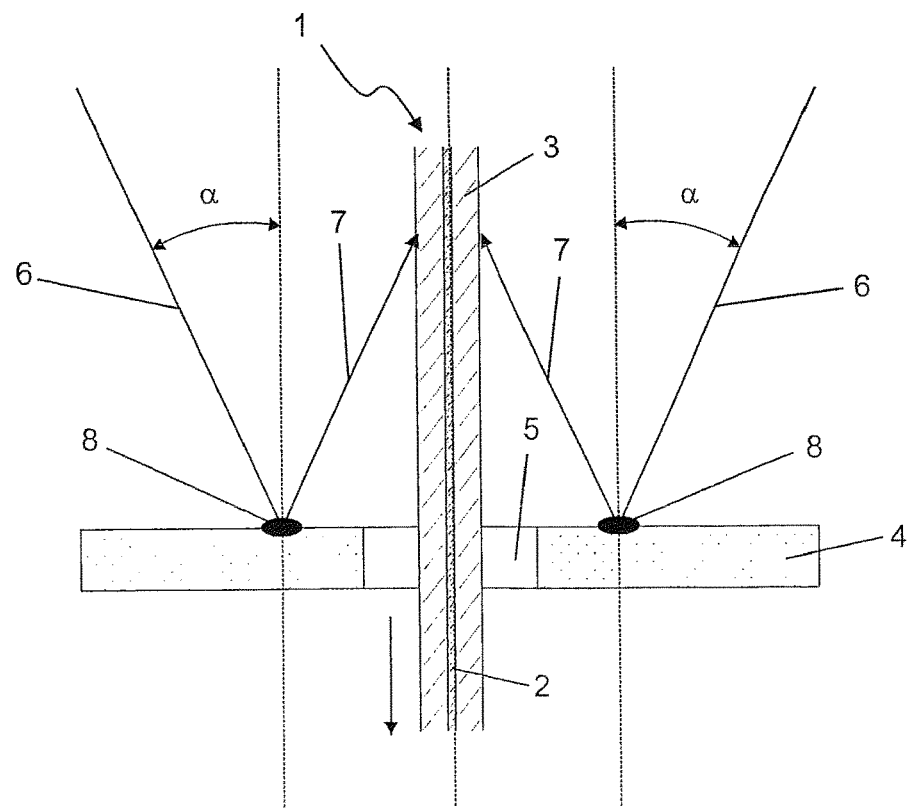
FIG. 2 shows a practical example of the invention in which the target circularly encloses the optical fiber.

With the practical example illustrated in FIG. 2, the laser beam 6 illuminates a ring zone 8 on the annular target 4. For this purpose, the laser beam 6 can either be deflected continuously or an annular or ring-segment shaped laser beam 6 is formed by suitable optics. The coating material deposits from all sides over the entire circumference of fiber 1 on its cladding 3.

With a predefined application wavelength, the material of the coating substance deposited on fiber 1 is as highly transparent as the fiber material itself. Therefore, in the inventively applied coating, there is no significant absorption of the radiation propagating in the waveguide. The coating only serves for light scattering in order to eliminate that portion of the radiation propagating in the fiber cladding 3 which is undesired for the relevant application.

The invention claimed is:

1. Method for producing an optical waveguide (1), a surface of which is at least partly coated with a coating material, said coating material contained in a target (4) being evaporated by means of laser radiation (6) from a process laser whereupon the coating material deposits on the surface of the optical waveguide (1) and forms a coating thereon modifying the light guidance, wherein the optical waveguide (1) is moved either continuously or intermittently in its longitudinal axis relative to the target (4) so that the coating is formed on a cladding section with a pre-definable longitudinal extension, wherein the laser radiation impinges on the target and is partly reflected from the target (4), wherein the reflected laser radiation (7) impinges on the surface of the optical waveguide and heats-up the optical waveguide (1), said laser radiation (6) being polarized and impinging on the target (4) at a specified angle ($\alpha$) between 10° and 80° relative to the surface normal, wherein the process laser initially emits continuously at a lower performance rate in order to heat-up the optical waveguide (1), after which the process laser emits in a pulsed mode at a higher performance rate in order to remove the coating material or to convert it into a different aggregate state.

2. Method according to claim 1, wherein the coating material is transparent to a light propagating in the optical waveguide (1) at an application wavelength.

3. Method according to claim 1, wherein the coating material at least partly absorbs the laser radiation from the process laser.

4. Method according to claim 1, wherein the process laser is a $CO_2$-laser.

5. Method according to claim 1, wherein the coating material is doped or undoped silica glass.

6. Method according to claim 1, wherein the optical waveguide (1) is rotated about its longitudinal axis during formation of the coating.

7. Method according to claim 1, wherein the target (4) circularly encloses the optical waveguide (1) wholly or partly.

8. Method according to claim 7, wherein the target (4) is irradiated from the process laser in a ring-shaped zone (8) wholly or partly enclosing the optical waveguide (1).

9. Method according to claim 1, wherein the optical waveguide (1) is an optical fiber.

10. Method according to claim 1, wherein after formation of the coating a glass capillary is collapsed on the optical waveguide (1) and thus forms a protective sheathing.

11. Method according to claim 1, wherein the formation of the coating is executed under normal atmosphere.

12. Method according to claim 1, wherein the coating is formed over several centimeters along the longitudinal extension of the optical waveguide (1).

13. Method according to claim 1, wherein the diameter of the optical waveguide (1) including coating accounts for 125 µm up to 10 mm.

14. Method according to claim 1, wherein the coating material is deposited on the surface (3) of the optical waveguide (1) consecutively in several layers.

* * * * *